United States Patent [19]

Stroppina et al.

[11] Patent Number: 5,005,076
[45] Date of Patent: Apr. 2, 1991

[54] DCT VIDEO SIGNAL COMPRESSION DEVICE WITH INTRAFIELD/INTERFIELD SWITCHING AND ADJUSTABLE HIGH FREQUENCY FILTER

[75] Inventors: Mario Stroppina, Turin; Luigi Ronchetti, Como, both of Italy

[73] Assignee: RAI Radiotelevisione Italiana S.p.A., Italy

[21] Appl. No.: 489,486

[22] Filed: Mar. 6, 1993

[30] Foreign Application Priority Data

May 12, 1989 [EP] European Pat. Off. ........ 89830208.8

[51] Int. Cl.⁵ .............................................. H04N 7/12
[52] U.S. Cl. .................................... 358/135; 358/136
[58] Field of Search ............... 358/135, 136, 133, 105; 375/122, 27; 364/725

[56] References Cited

U.S. PATENT DOCUMENTS

| 4,825,285 | 4/1989 | Speidel et al. | 358/136 X |
| 4,833,535 | 5/1989 | Ozeki et al. | 358/136 X |
| 4,897,855 | 1/1990 | Acampora | 358/136 X |
| 4,941,043 | 2/1990 | Jass | 358/136 |

OTHER PUBLICATIONS

"Scene Adaptive Coder", by W. Chen and W. K. Pratt, *IEEE Transaction on Communications*, vol. Com-32, No. 3, Mar. 1984, pp. 225–232.
2nd International Workshop on Signal Processing of HDTV, 29 Feb.–2 Mar. 1988, vol. 2, pp. 2, 4, 6, 8.

*Primary Examiner*—Victor R. Kostak
*Attorney, Agent, or Firm*—R. Neil Sudol; Henry D. Coleman

[57] ABSTRACT

The digital signal is decomposed in intrafield blocks each comprising a set number of adjacent image elements, and each intrafield block, or an intrafield block or an interframe block derived therein, is subjected to a Discrete Cosine Transform and the transformed signal is applied to quantizer to generate a quantized signal which is encoded at variable length and loaded to a transmission buffer, the quantization resolution being inversely proportional to the buffer fill rate. According to the invention, a digital low-pass filter is connected to filter the block to be subjected to Discrete Cosine Transform, and is subjected to the buffer so that its upper-frequency cutoff lowers as the buffer fill rate increases.

11 Claims, 3 Drawing Sheets

DCT VIDEO SIGNAL COMPRESSION DEVICE WITH INTRAFIELD/INTERFIELD SWITCHING AND ADJUSTABLE HIGH FREQUENCY FILTER

BACKGROUND OF THE INVENTION

The present invention relates to an improved device for the DCT encoding of digital video signals.

As it is known, the conventional color digital video signal comprises a luminance component Y and two chrominance components Cr and Cb. The luminance component is sampled at 13.5 MHz, while each of the chrominance components is sampled at 6.75 MHz (CCIR. Recommendation 601, Dubrovnik 1986). Each sample of the single components is made of 8 bits. Thus the required bit per second flow rate for transmitting such a signal is 216 Mbit/sec i.e. 8*(13.5+6.75+6.75) éand, even with an elimination of the line and frame synchronisms transmission, the bit timing reduction cannot be over 25%. In the case of high definition video signals, the bit timing will be even 4 or 5 times the described one. It is thus apparent how the tramission of those signals would require high capacity transmission channels.

In order to reduce the bit rate of those digital video signals without significantly reducing the image quality, it is known to use the Discrete Cosine Transform (DCT) for encoding the video signal reducing the redundancy. In such encoding (as it will be more apparent from the following description) data are generated that are at least partially freed from the information tied to the spatial correlation of the image or also freed from the information connected to the time correlation of the image with respect to former images (frame or field) of the video signal. Consequently, the generated data flow is not uniform, as it can be very low in case of static images or very high in case of rapidly variable images. In these encoding systems, an output buffer is therefore provided, which is fed with a variable data flow and is emptied into the transmission channel with constant speed, depending on the transmission channel capacity.

In these encoding systems, the buffer is necessarily liable to occasional saturation, occuring the more often is the lower transmission channel capacity. This must be avoided because it may cause data to be lost with consequent decoding errors; for this purpose it is known to have a rough quantization of the DCT coefficients as the buffer is filled up. This naturally causes an increase of quantization noise and a deterioration of the reconstructed image. This effect is more evident when channels of reduced capacity are used, corresponding to an encoding of 1 to 1.5 bit/pel, for example, channels of 10–15 Mbit/sec, for noraml definition video signals (CCIR Recommendation N.601), or of 50–70 Mbit/sec for high definition video signals.

SUMMARY OF THE INVENTION

The main object of the invention is to provide an improved encoder that, when using low capacity channels, lowers the average number of bits at the buffer input without excessively increasing the quantization noise of the DCT coefficients and, at the same time, can operate with no worse performances than the known encoders when dealing with high capacity channels.

The invention achieves the above mentioned object as well as other aims and advantages as will be apparent by the following description, with a device for the DCT encoding of video signals, in which a digital video signal is split into intrafield blocks each comprising a set number of adjacent image elements, each of said intrafield blocks, or an interfield or interframe block derived therein, is subjected to a Discrete Cosine Transform and the transformed signal is applied to a quantizer for generating a quantized signal which is encoded at variable length and loaded to a transmission buffer, the quantization resolution being inversely proportional to the buffer fill rate, characterized in that the device further comprises a digital low-pass filter connected to filter the block to be subjected to Discrete Cosine Transform, the filter being subjected to the buffer so that an upper-frequency cutoff of the filter is lowered as the buffer fill rate increases.

BRIEF DESCRIPTION OF THE DRAWINGS

The invention will be now described in more detail with reference to some of its preferred embodiments, illustrated in the enclosed drawings, given by way of illustrative and not restrictive example, and in which.

DETAILED DESCRIPTION OF THE PREFERRED EMBODIMENT

Figure 1:
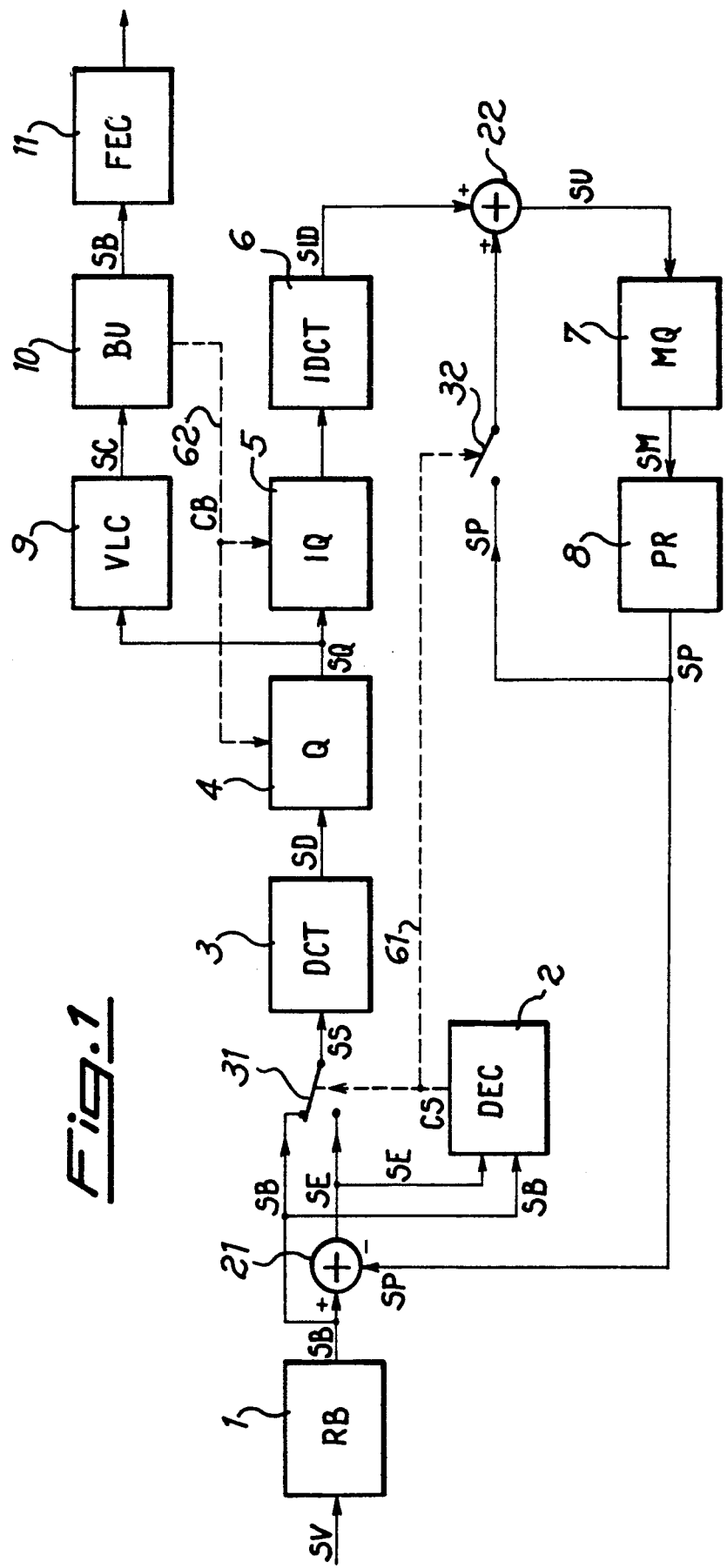
FIG. 1 is a block diagram of a DCT encoder according to the prior art.

With reference to FIG. 1, in a typical DCT encoder device, illustrated by way of example, a conventional digital video signal SV is applied to a line-block converter RB1, which splits each field of signal SV into groups of 8 lines, usually called "stripes", and then each strip into 8×8 pel blocks, called "blocks", resulting in a train of block signals SB. Such splitting is separately performed for the chrominance and luminance components, using the same coding algorithm, but for the sake of simplicity only the luminance component will be considered.

The signal block SB at the converter 1 output is applied to an adder 21 which computes the difference between each block of SB and a prediction block SP providing a difference block SE of 8×8 pel which contains the prediction error; as it will be explained later, the prediction block SP is obtained from the processed signal of the preceding field (interfield mode) or from the signal of the preceding frame (interframe mode). For a simpler illustration, only the interfield block is referred to in the description and drawings, it being understood that the circuits will be normally applied to both the interfield block proper and the interframe block. Where the video signal has been generated according to a non interlaced standard, such a distinction is lost and only the interframe block remains.

The 8×8 pel choice is typical but it is indicated purely by way of example, as it is possible, within the invention, to choose arbitrary numbers n and m for the two block dimensions.

Both the signal block SB (intrafield) and the difference block SE (interfield) are applied to the two inputs of a switch 31 and to two inputs of a per se known selector DEC 2 of the interfield/intrafield modes. The selector 2 compares the two signals for each block and emits a signal CS to control the switch 31 to choose the one of the two blocks that minimizes the generated bit number. The block SB contains both space and time correlations of the image and it is called "intrafield block", while the block SE has been cleared by the time correlations, thus mainly containing space correlations between successive images, and it is called "interfield block" or "interframe block" depending whether the two compared fields belong to the same frame or to two different frames. The intrafield or interfield (interframe) blocks SB or SE leaving the switch 31 as signal SS are applied to a circuit 3 which generates the bidimensional Discrete Cosine Transform DCT of the signal block 8×8 (per se known), giving out transformed blocks SD, i.e. 8×8 blocks of DC coefficients. Signal SD is then applied to an adaptative quantizer 4 (also per se known) which outputs a corresponding block SQ of quantized DCT coefficients.

Block SQ enters a variable length encoder 9, where it is converted into a variable word length code, for example as described in Rafael C. Gonzales and Paul Wintz, "Digital Image Processing", Second Edition, Addision Wesley, pages 262–268. According to the criteria described therein, the code words constituted by few bits are assigned to the least probable amplitude levels in order to reduce the mean number of bits necessary for transmitting the coefficients. Furthermore, a diagonal scanning of the signal SQ is used to produce many consecutive null coefficients and thus to utilize a shortened encoding of zero sequences (Gonzales and Wintz, op, cit., pages 288–289).

The generated code words SC are then loaded to a buffer and, with a constant rate, therefrom transferred to a transmission encoder 11, which generates the data to be transmitted on the channel, typically introducing codes for correcting errors and other selected control codes.

To obtain the prediction signal SP (interfield or interframe block) a decoding chain is enclosed in the encoding system and comprises an inverse quantizer 5 and an Inverse Discrete Cosine Trans-form circuit 6, adapted to generate a signal SID which is the reconstruction of the input signal of circuit DCT 3, and also an adder 22, a frame memory 7, a predictor circuit 8, all per se known, with a switch 32 between the output of the predictor 8 and one of the inputs of adder 22. If the signal SID is an intrafield block, switch 32 is opened by signal CS of predictor 2 and signal SID is directly stored as signal SU in the frame memory 7. If signal SID is an interfield block (difference), switch 32 is closed by the predictor 2 in order to add SID to SP to obtain signal SU which enters the field memory 7.

As stated in the introduction, since the buffer 10 can saturate in cases of images having a high information content, it is known to adjust the quantization resolution in quantizer 4 (as well as in the inverse quantizer 5) as schematically illustrated by the dashed line connection 62, in order to make a rougher quantization when the buffer is close to overflow. In practice, a group CB, of the more significant bits of the current address of buffer 10, is used as an address in a non-illustrated memory containing a table of the possible amplitudes of the quantization step, in a per se known manner and thus not described for the sake of brevity in the present description.

By using a rougher quantization, the quantized coefficient levels are reduced and the consecutive zero sequences are lengthened. Of course, the quality of the processed and reproduced image is thus degraded, because the quantization noise increases. On the other hand, when the buffer tends to become empty, the quantization precision is enhanced and, filler words may then be generated for the sole purpose of feeding the channel.

Figure 2:
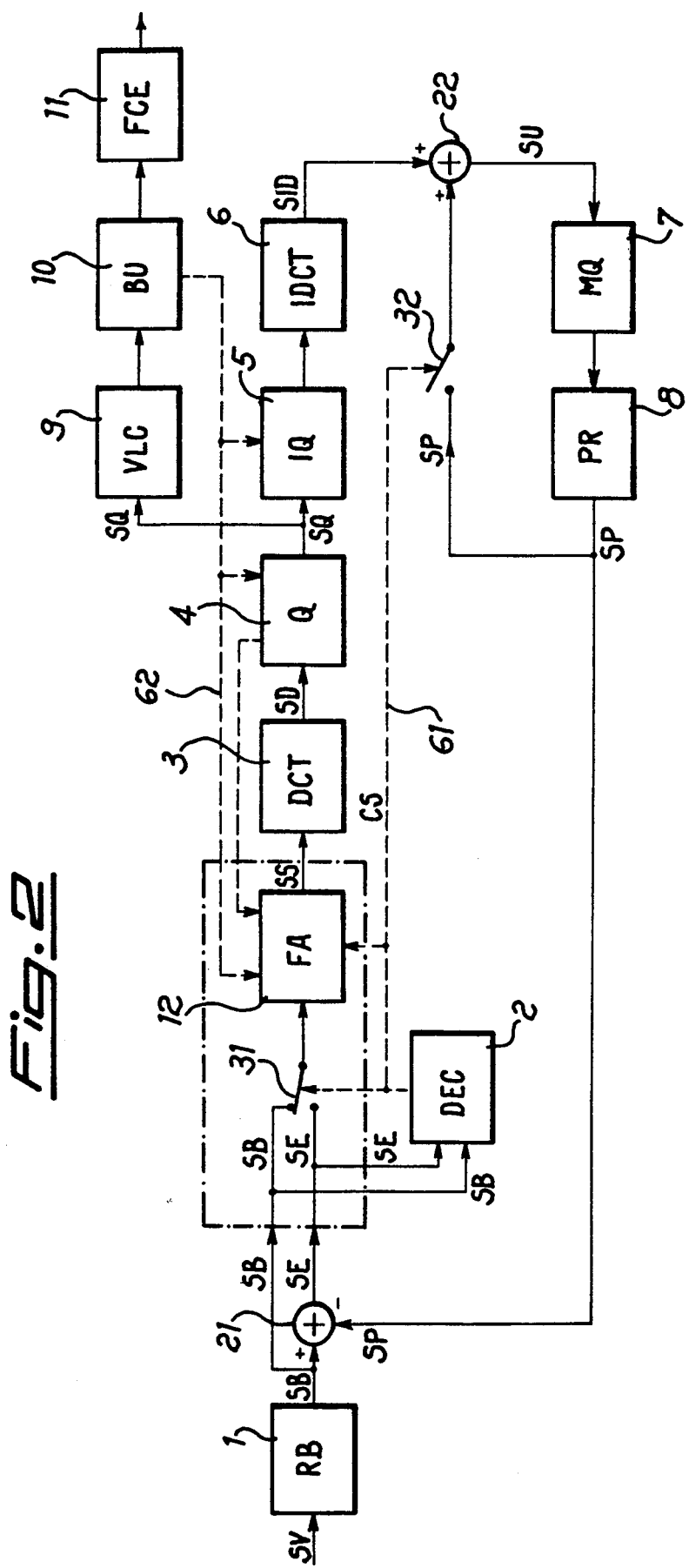
FIG. 2 is a block diagram of a DCT encoder according to a first preferred embodiment of the invention.

FIG. 2 shows the block diagram of a DCT encoding system similar to that of FIG. 1 and improved according to a first aspect of the invention. The system comprises the same modules and functional connections of FIG. 1, and designated by the same reference signs, but it is different in that a digital low-pass filter 12 is inserted downstream of the switch 31, which is controlled by the selector 2; the output SS of the filter 12 is applied to the Discrete Cosine Transform circuit 3. This filter attenuates the high frequencies in the signal SB or SE which is to be transformed, thus reducing the levels of the corresponding DCT coefficients, and consequently lengthening the zero sequences and reducing the time rate of the bits applied to the buffer. The filter characteristic, i.e. its cutoff frequency, is controlled by the same quantization resolution control signal CB through connection 62 (shown by a dashed line), in order to lower the cutoff frequency according to the fill rate of the buffer. The filter is controlled in such a way that when the buffer fill rate exceeds a first threshold, so as to cause the onset of a stronger filtering, the filter return to the weaker filtering only when the fill rate has gone below a second threshold which is lower than said first threshold. In other words, the transit thresholds of the filtering action are offset in rising or falling or, still in other words, the filter is controlled with hysteresis. If course, when the quantizer is working at the highest resolutions, the filter is conrtrolled for discontinuing any attenuation.

Figure 3:
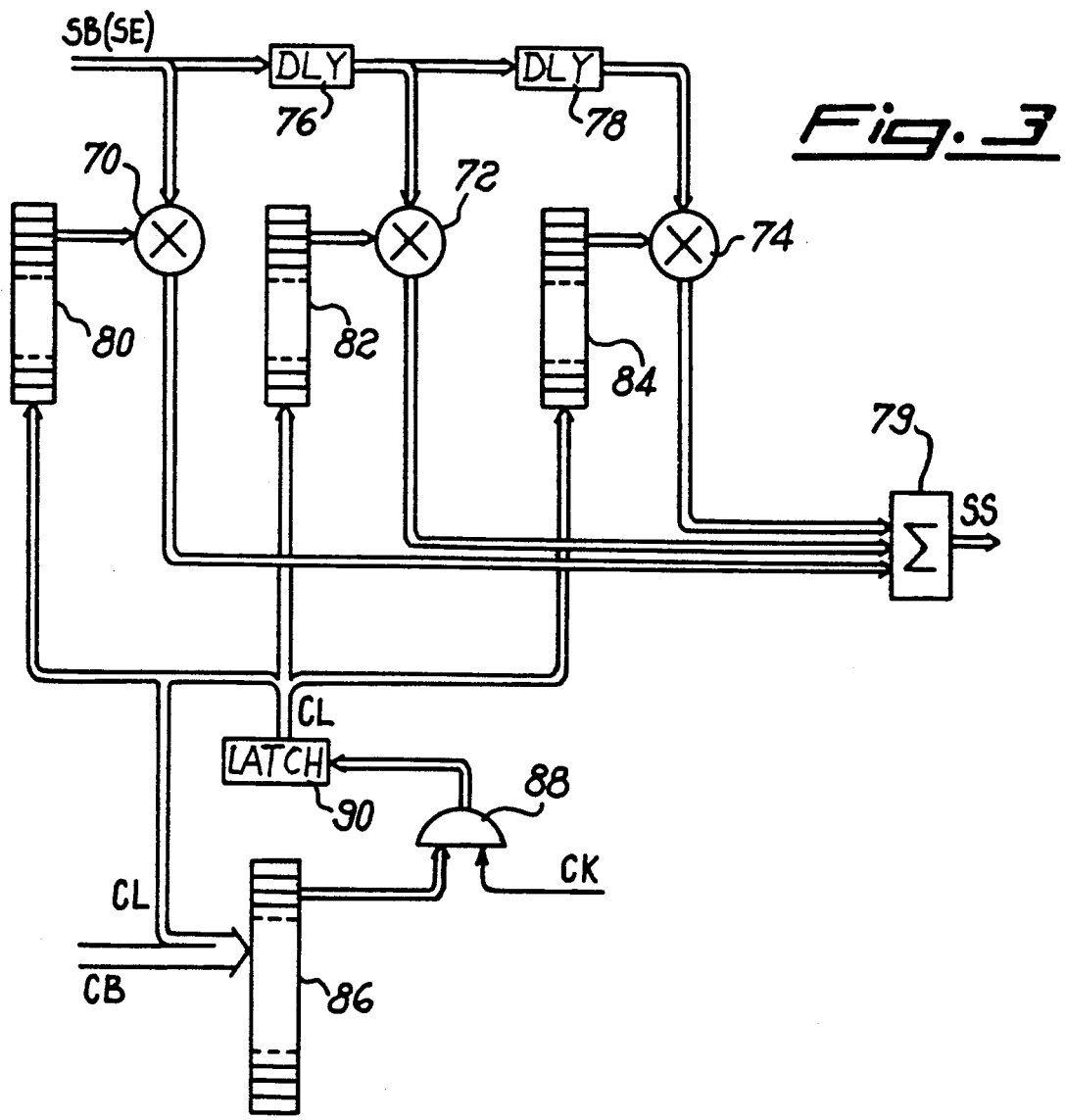
FIG. 3 is a partial block diagram, more in detail, of a portion of the encoder of FIG. 2.

FIG. 3 schematically and partially shows a preferred embodiment of the filter 12 used for attenuating the behaviour described above. In a known manner the filter comprises a plurality of multipliers 70, 72, 74, driven by the input signal SB or SE through a chain of delay elements 76, 78, the outputs of the multipliers being grouped in an adder 79, the output SS whereof is the selected filtered signal. The second inputs of the multipliers 70, 72, 74 are connected to respective outputs of ROM memories 80, 82, 84, which contain tables corresponding to the selected multiplier factors for the different operating modes, or different cutoff frequencies for the filter.

For generating the address to be applied to the ROM memories 80, 82, 84, the filter, according to the invention, comprises a ROM memory 86 for selecting the filtering and having an output applied to a gat 88 which is in turn on a latch register 90. Gate 88 is enabled to transfer an incoming signal on the latch 90 by a timing signal CK having the same timing of the "stripes" of the video signal. The outgoing signal CL of latch 90 controls the address inputs of all the ROMs 80, 82, 84, in parallel. The address which controls the filtering selector ROM 86 is formed by associating the bit lines constituting the output signal CL of latch 90 with the bits of signal CB coming from buffer 10 as indication of the fill level. By loading the ROM memory 86 with selected filtering values according to banks corresponding to the different values of CL, according to criteria known in the art, the desired behaviour "with hysteresis" is obtained, i.e. with different thresholds according to the raising or falling direction of the filter fill rate.

With the use of filter 12, the reproduced image will not have an increase of noise caused by the quantization of the DCT coefficients, but just a loss of definition given by the attenuation of the high frequencies. Such a loss of definition is less annoyig to the user than a high quantization noise which shows up in the reproduced image as spot alterations, or "grain", on the image.

The operation of the filter on the signal is such that it is not necessary to give any information on the filter operation in the transmitted data, since the decoding at the other end of the channel no filter is necessary nor any operation connected to it: any modification in the filter choice and in the variation law of its characteristic concerns the decoder only.

According to a different embodiment, the filter characteristic is subjected also to the inter/intra selector 2, in order to filter the intrafield blocks more strongly than the interfield blocks (and/or interframe). In fact, on average the interfield blocks contain image parts having a strong time movement, while the interfield blocks contain image parts having a weak time movement. Since, as it is known, details are scarecely perceived by the eye in rapidly moving image parts, it is therefore acceptable to have a greater band limitation for these than for the static image cases, the same image quality being subjectively perceived.

Figure 4:
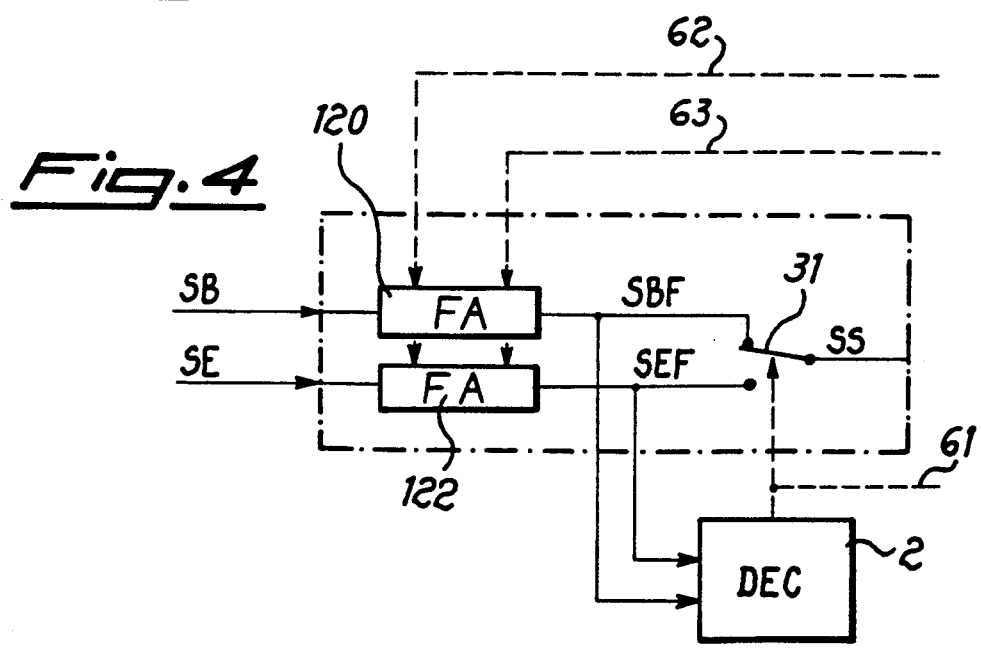
FIG. 4 is a partial block diagram of a DCT encoder according to further preferred embodiment of the invention.

FIG. 4 shows a second embodiment of the invention, more complex but also more sophissticated. For simplicity, FIG. 4 shows only the part of block diagram which differs from that of FIG. 2. Instead of inserting a low-pass filter 12 downstream of switch 31, as in the embodiment of FIG. 2, two filters 120 and 122 are inserted, respectively for signal SB (intrafield) and for signal SE (interfield and interframe). Each of the two filters 120 and 122 is tied to the quantization resolution rate in a way similar to that of filter 12 of FIG. 2.

In this way the inter/intra selector 2 makes the selection on already filtered signals, and thus takes into account possible changes the filtering makes on signals SB and SE, such as to suggest a different selection. Generally, the efficiency and quality of the image can be improved at the cost of a greater circuit complication.

It is apparent that where it is necessary to distinguish the interfield block from the interframe block, three filters will be used instead of two, with the same conditions described above.

Both filter 12 and filters 120, 122 can be linear or nonlinear (with respect to the signal amplitude), according to criteria known in the art, Furthermore, the whole filter can be either monodimensional or bidimensional.

The invention has been illustrated in some of its preferred embodiments, applied to a typical known device, illustrated in FIG. 1, but the principles of the invention are applicable also to other similar devices. It is also apparent that filter 12 or filters 120, 122 may be controlled, instead by the signal CB coming from buffer 10, by an appropriate signal provided by the quantizer 4, indicating the current quantization resolution: also in this case the filter is subjected to buffer 10 anyway, because of the tight connection between the buffer and the quantizer.

At the end of the filtering operations, only the samples present in the 8×8 block to be filtered may be used, or, in order to eliminate the attack transients of the filter in the single block, samples taken from the adjacent blocks can be used, as many as there are in the impulsive timelapse of the filter. In this second case, part of the samples must be taken from the blocks preceding the one to be filtered, and part from the following blocks. The memory will have to be increased in order to contain the added samples, and it will have to be introduced in the DCT treatment a delay equal to the number of samples taken from the blocks following the one to be filtered.

Alternatively, to reduce the memory increase and to avoid delays in the processed signal, only the samples belonging to the blocks preceding that to be filtered can be added. It is thus eliminated the transient is thus removed from the start edges of the block but not from the end edges. In all these cases though, it is necessary to use filters having a very short pulse response time. In fact a long pulse reponse time of the filter requires a great deal of added memory and a great delay in case of filterinng without transient state, while it can prevent the filter from reaching steady state in case of filtering with transisents on the edges.

The above mentioned techniques for eliminating the transient states at the edges of the blocks are to be considered comprised in the definition of filtering of the blocks as described above and claimed in the claims.

Some of the preferred embodiments of the invention have been described, but naturally many modifications and variations are, within the scope of the inventive concept, evident for the man of the art.

What is claimed is:

1. A digital video signal compression device comprising:
   line-block converter means for converting an incoming digital video signal intrafield blocks each including a predetermined number of adjacent image elements;
   a digital adder having a non-inverting input operatively connected to an output of said converter means, an inverting input and an output;
   a processing chain including an input, a digital low-pass filter, a DCT transformer and a quantizer connected in cascade to each other;
   a variable-length coder connected to an input to an output of said quantizer;
   switching means, operatively connected to the output of said converter means, to the output of said adder and to the input of said processing chain, for selectively applying to the input of said processing chain an intrafield block from said converter means during an intrafield mode of operation and an interfield block during an interfield mode of operation;
   a predictor chain operatively connected to the output of said quantizer, said predictor chain including an inverse quantizer, an inverse DCT transformer and predicting means for generating a predicted block signal and applying said signal to the inverting input of said adder to generate said interfield block;
   selector means, operatively connected to said converter means, said switching means and to the output of said adder, for comparing each intrafield block with a corresponding interfield block and setting said switching means in said intrafield mode of operation if such intrafield block has less information content than said corresponding interfield block and alternatively setting said switching means in said interfield mode of operation if such intrafield block has greater information content than said corresponding interfield block; and
   output buffer means operatively coupled to said variable-length coder for temporarily storing compressed video signals therefrom, said buffer means being operatively connected to said quantizer and inverse quantizer for changing quantization resolutions thereof inversely with a fill rate of said buffer means, said buffer means being operatively coupled to said filter for varying an upper cutoff frequency thereof inversely with the buffer fill rate.

2. The device of claim 1 wherein the quantizer of said processing chain is operatively connected to said filter for controlling same to substantially exclude filtering when a quantization resolution is at a maximum.

3. The device of claim 1 wherein the quantizer of said processing chain is operatively connected to said filter for controlling same to change said upper cutoff frequency proportionally to a quantization resolution.

4. The device of claim 1 wherein said selector means is operatively connected to said filter to controls same to attenuate more strongly high frequencies in a filtered signal when said switching means is in said intrafield mode of operation.

5. A digital video signal compression device comprising:

line-block converter means for converting an incoming digital video signal into intrafield block signals each encoding a predetermined number of adjacent image elements;

digital adding means operatively connected to said converter means for subtracting from each incoming intrafield block signal a predicted block signal to generate a corresponding difference block signal;

switching means, operatively connected to said converter means and said adder, for selectively transmitting an intrafield block signal from said converter means during an intrafield mode of operation and a difference block signal from said adding means during an interfield mode of operation;

digital low-pass filter means connected to said switching means at an output thereof for filtering high frequencies from the transmitted signal from said switching means;

processing means operatively coupled to said filter means for producing a reduced density video data signal from the filtered signal from said filter means;

predictor means operatively connected to said processing means for generating said predicted block signal from said reduced density video data signal and feeding said predicted block signal to said adding means;

selector means, operatively connected to said converter means, said switching means and said adding means, for comparing each intrafield block signal with the corresponding difference block signal and setting said switching means in said intrafield mode of operation if such, intrafield block signal has less information content than the corresponding difference block signal and alternatively setting said switching means in said interfield mode of operation if such intrafield block signal has greater information content than the corresponding difference block signal; and output buffer means operatively coupled to said processing means for temporarily storing said reduced density video data signal therefrom.

6. The device of claim 5 wherein said processing means includes a DCT transformer and a quantizer connected in cascade to each other and to said filter means, said processing means further including a variable-length coder connected at an input to an output of said quantizer.

7. The device of claim 6 wherein said buffer means is operatively connected to said quantizer, said predictor means including an inverse quantizer and an inverse DCT transformer.

8. The device of claim 7 wherein said buffer means is operatively connected to the quantizer of said processing means for changing quantization resolutions thereof inversely with a fill rate of said buffer means, said buffer means being operatively coupled to said filter means for varying an upper cutoff frequency thereof inversely with the buffer fill rate.

9. The device of claim 6 wherein the quantizer of said processing means is operatively connected to said filter means for controlling same to substantially exclude filtering when a quantization resolution is at a maximum.

10. The device of claim 6 wherein the quantizer of said processing chain is operatively connected to said filter means for controlling same to change an upper cutoff frequency of said filter means proportionally to a quantization resolution.

11. The device of claim 5 wherein said selector means is operatively connected to said filter means to control same to attenuate more strongly high frequencies in a filtered signal when said switching means is in said intrafield mode of operation.

* * * * *

UNITED STATES PATENT AND TRADEMARK OFFICE
CERTIFICATE OF CORRECTION

PATENT NO. : 5,005,076

DATED : April 2, 1991

INVENTOR(S) : Mario Stroppiana; Luigi Ronchetti

It is certified that error appears in the above-identified patent and that said Letters Patent is hereby corrected as shown below:   On the Title page Item [75], change first inventor's surname from "Stroppina" to --Stroppiana--; filing date, change year from "1993" to --1990--.

In the Abstract, line 6, insert --a-- after "to" (first occurrence).

Column 1, line 14, change "CCIR." to --CCIR,--; line 10, change "éand" to --é and--; line 22, change "tramission" to --transmission--; line 53, change "noraml" to --normal--.

Column 2, line 58, insert -- - -- (hyphen) between "non" and "interlaced".

Column 3, line 41, change "Trans-form" to --Transform--.

Column 4, line 27, change "return" to --returns--; line 35, change "conrtrolled" to --controlled--; line 53, change "gat" to --gate--.

Column 5, line 5, change "annoyig" to --annoying--; line 10, insert --in-- after "since"; line 22, change "scarecely" to --scarcely--; line 28, change "sophissticated" to --sophisticated--; line 49, change "art," to --art.--.

Column 6, line 10, delete "It is thus eliminated" and change "the"

UNITED STATES PATENT AND TRADEMARK OFFICE
CERTIFICATE OF CORRECTION

PATENT NO. : 5,005,076

DATED : April 2, 1991

INVENTOR(S) : Mario Stroppiana; Luigi Ronchetti

It is certified that error appears in the above-identified patent and that said Letters Patent is hereby corrected as shown below:

to --The--; line 16, change "filterinng" to --filtering--; line 18, change "transisents" to --transients--.

Col. 6, Claim 1, line 40, change "to" (first occurrence) to --at--; line 31, insert --into-- after "signal".

Col. 4, Claim 4, line 17, change "controls" to --control--.

Col. 8, Claim 5, line 36, delete "," (comma).

Signed and Sealed this

Twenty-third Day of February, 1993

Attest:

STEPHEN G. KUNIN

*Attesting Officer*     *Acting Commissioner of Patents and Trademarks*